(12) United States Patent
Herzog

(10) Patent No.: US 8,030,602 B2
(45) Date of Patent: Oct. 4, 2011

(54) INDUCTION SEALER SYSTEM WITH TEMPERATURE SENSOR

(76) Inventor: Kenneth J Herzog, Riverhead, NY (US)

( * ) Notice: Subject to any disclaimer, the term of this patent is extended or adjusted under 35 U.S.C. 154(b) by 82 days.

(21) Appl. No.: 12/412,162

(22) Filed: Mar. 26, 2009

(65) Prior Publication Data

US 2009/0183470 A1 Jul. 23, 2009

Related U.S. Application Data

(62) Division of application No. 10/859,830, filed on Jun. 2, 2004, now Pat. No. 7,528,352.

(60) Provisional application No. 60/572,027, filed on May 17, 2004.

(51) Int. Cl.
*H05B 6/16* (2006.01)
(52) U.S. Cl. ........................................................ 219/653
(58) Field of Classification Search ........... 219/600–677
See application file for complete search history.

(56) References Cited

U.S. PATENT DOCUMENTS

| | | | |
|---|---|---|---|
| 4,015,366 A | 4/1977 | Hall | |
| 5,177,340 A | 1/1993 | Zaffiro | |
| 5,749,201 A | 5/1998 | Cochrane | |
| 7,528,352 B2 * | 5/2009 | Herzog | 219/653 |
| 2002/0020144 A1 | 2/2002 | Sarles et al. | |
| 2004/0053718 A1 | 3/2004 | Pang | |
| 2004/0164070 A1 | 8/2004 | Terano | |

* cited by examiner

*Primary Examiner* — Daniel L Robinson
(74) *Attorney, Agent, or Firm* — Ostrolenk Faber LLP

(57) ABSTRACT

An induction foil cap sealer of the present invention includes a cap foil sealer head installed along a conveyor. A controller is operatively connected to the cap sealer head. An infrared detector is adapted to obtain temperature data from a work piece on the conveyor. An electronic memory storage device is capable of storing electronic data, and is operatively connected to the controller. A comparator is in communication with the controller, the electronic memory and the infrared detector. The comparator compares the temperature data with pre-stored electronic data in the electronic memory storage and sends a signal to the controller based on the comparison.

8 Claims, 9 Drawing Sheets

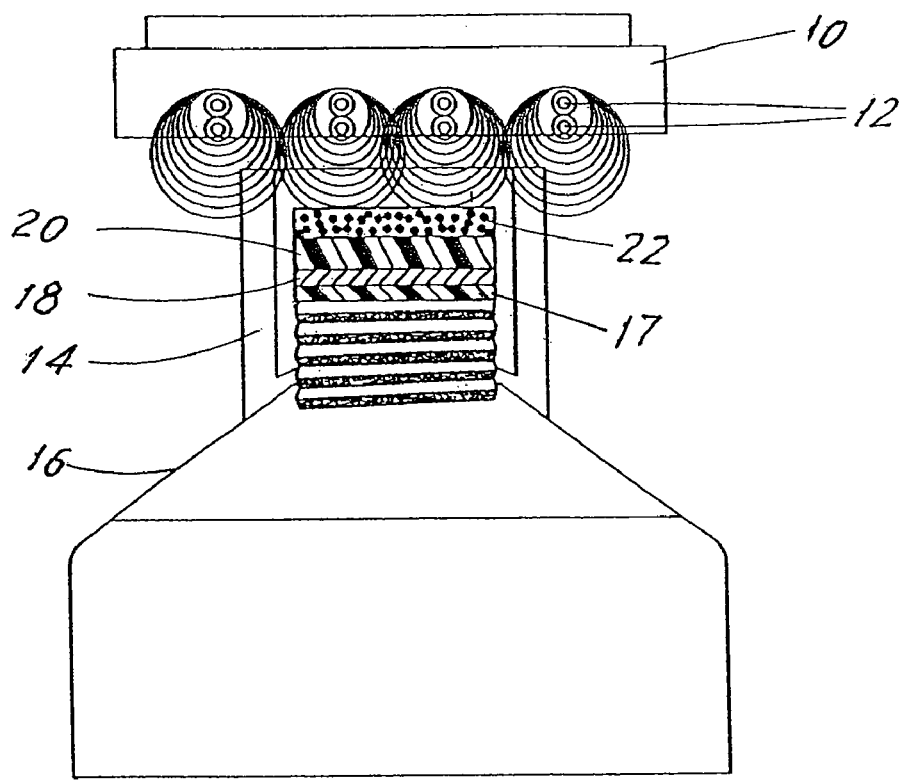
FIG. 1
(PRIOR ART)
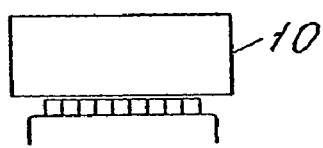    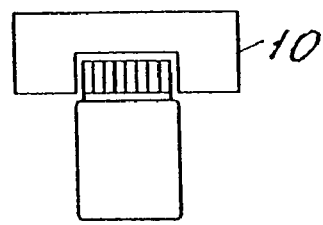    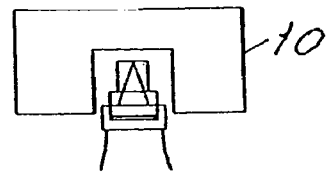
FIG. 2A　　　FIG. 2B　　　FIG. 2C
(PRIOR ART)　　(PRIOR ART)　　(PRIOR ART)

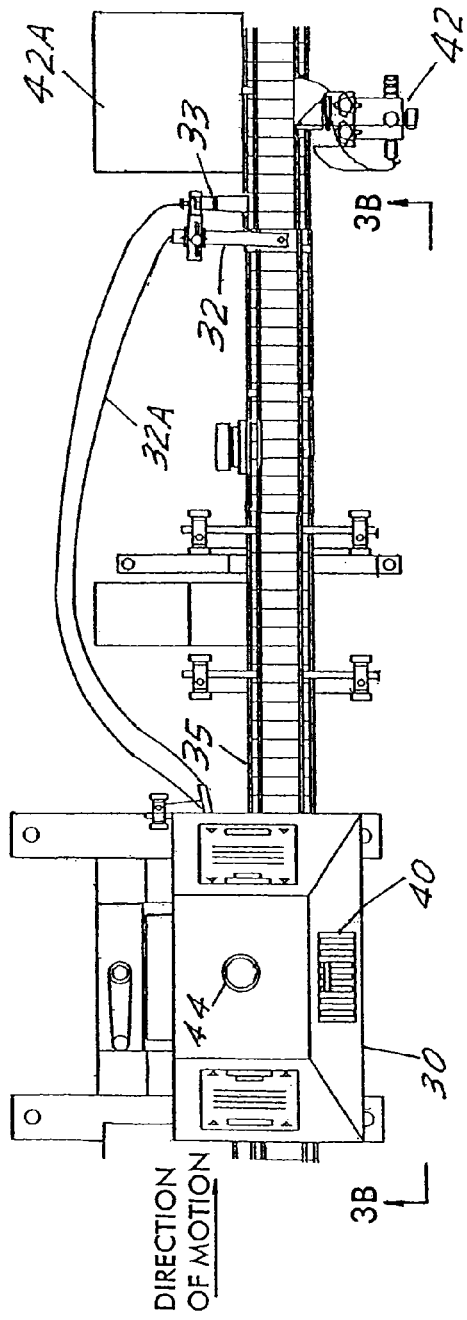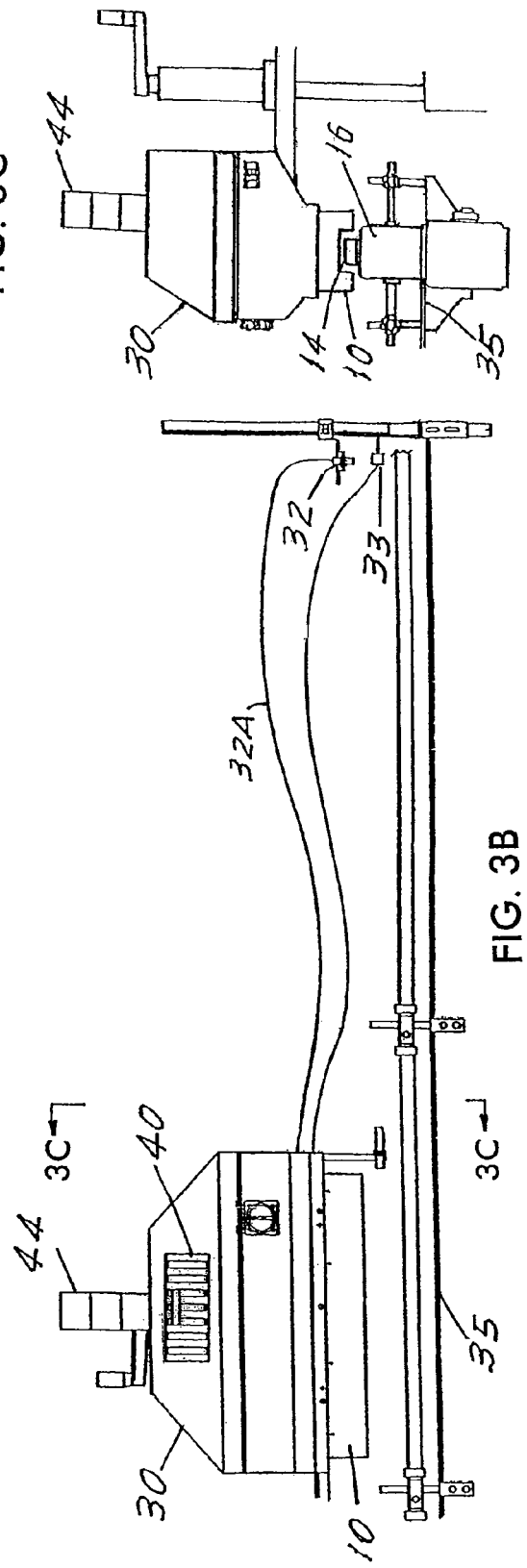

INDUCTION SEALER SYSTEM WITH TEMPERATURE SENSOR

CROSS REFERENCE TO RELATED APPLICATIONS

The present application is a divisional of U.S. patent application Ser. No. 10/859,830, filed Jun. 2, 2004, which claims benefit of and priority to U.S. Provisional Patent Application No. 60/572,027, filed May 17, 2004, in the name of Kenneth J. Herzog, and entitled A BAR GRAPH DISPLAY, AN IR THERMOMETER, AND A SPEED SENSOR WHICH CAN BE USED INDIVIDUALLY OR IN COMBINATION WITH AN INDUCTION SEALER, the contents of each of which are hereby incorporated by reference.

This application is related to U.S. application Ser. No. 10/860,753 filed concurrently with the present application in the name of Kenneth J. Herzog, and entitled CAP SEALER WITH GRADUATED POWER DISPLAY which issued on Sep. 4, 2007 as U.S. Pat. No. 7,265,325, the disclosure of which is hereby incorporated by reference.

This application is also related to U.S. application Ser. No. 10/860,756 filed concurrently with the present application in the name of Kenneth J. Herzog, and entitled CONVEYOR SPEED MONITOR, the disclosure of which is hereby incorporated by reference.

FIELD OF THE INVENTION

The present invention relates to induction foil cap sealers and more particularly to an induction foil cap sealer equipped with a device for determining the seal quality.

BACKGROUND OF THE INVENTION

Induction foil cap sealers are well known. Referring to FIG. 1, a prior art induction foil cap sealer includes induction head 10 which includes a plurality of field coils 12. In operation, field coils 12 receive an electrical current which causes the development of magnetic fields that project away from field coils 12. The projected magnetic fields are schematically shown as circular lines surrounding field coils 12 for illustration purposes only. The magnetic fields projecting from field coils 12 are used for sealing a cap onto an opening of a bottle in the following manner.

Cap 14 may be mechanically coupled to the opening of bottle 16 and placed under induction head 10. Due to the mechanical coupling between cap 14 and bottle 16, metallic foil 18, which is received in cap 14, is pressed between the end of cap 14 and the sealing edge of the opening of bottle 16. Included inside cap 14 is polymer sealing film 17 which is interposed between metallic foil 18 and the opening of bottle 16. Optionally, wax layer 20 and pulp board liner 22 are also included in cap 14 and sandwiched between metallic foil 18 and the closed end of cap 14.

To effect the seal, magnetic fields that project from field coils 12 permeate cap 14 and cause foil 18 to heat up. The heat so generated causes polymer sealing film 17 to melt and thus seal metallic foil 18 to the opening of bottle 16. As a result, a hermetic seal between metallic foil 18 and bottle 16 is obtained which can survive the removal of cap 14. If optional wax layer 20 is used, the generated heat melts wax layer 20 further enhancing the hermetic effect.

Induction head 10 may assume any number of shapes depending on the type of cap used. FIGS. 2A-2C illustrate three examples of induction heads.

Assuring the quality of the hermetic seal is commercially important. For example, when the content of a container is medicine, it is important for the consumer to know that the container has been sealed since leaving the manufacturer's plant. Otherwise, a consumer may suspect tampering and return the product, which results in the increase in the overall cost to the manufacturer. In addition, a hermetic seal may be required to keep the content of a container unexposed to environmental factors such as moisture in order to avoid damage to the content. In either case, assessing the quality of the seal before the container leaves the manufacturer is of great interest.

The quality of a seal obtained through induction sealing may be assessed manually. That is, each work piece (e.g. a container such as a bottle) can be inspected visually by a person. Such a process, however, is labor intensive and thus costly. Furthermore, such a process would require the removal of the cap to inspect visually the state of the seal after induction heating. The removal of the cap is also undesirable as it would require reassembly which also demands labor.

It would be desirable to have a method and a system for assessing the quality of the seal automatically in order to improve cost-efficiency, and to assure the quality of the seal.

SUMMARY OF THE INVENTION

According to the present invention after subjecting a workpiece to induction heating, a temperature reading is conducted, and based on the reading it is determined whether a proper seal has been obtained. Specifically, a temperature sensor is installed downstream (in a position after induction heating) to measure the temperature of the workpiece, and the temperature so obtained is compared to a low threshold temperature value and/or a high threshold temperature value to determine whether a proper seal has been obtained.

According to one aspect of the present invention, an infrared sensor may be used as the temperature sensor. The advantage of using an infrared sensor is that no contact with the workpiece is necessary to obtain its temperature. Thus, the temperature of the workpiece can be obtained remotely.

According to another aspect of the present invention, the low threshold temperature value and the high threshold temperature value are stored in respective electronic memory storage locations, and the temperature information acquired from a workpiece is stored in a temporary electronic memory location. Optionally, the acquired temperature may be displayed by a general purpose display such as an LCD monitor.

In a preferred embodiment of the present invention, each time temperature information is acquired from a workpiece a comparator compares the acquired temperature to the low threshold temperature value and the high threshold temperature value. If the acquired temperature is below the low threshold temperature value it is determined that a proper seal has not been obtained and a fault signal is generated. If the acquired temperature is above the high threshold temperature value it is determined that excessive damage (e.g. burning) has been sustained by the work piece due to overheating and a fault signal is generated.

The generation of a fault signal can be used to activate a peripheral device. For example, a rejecter, which may be a pneumatic device, may be actuated to remove the work piece. Alternatively or in addition to the rejecter, a warning signal generator which may be an audio signal generator such as an alarm or an optical signal generator such as a strobe light may be activated to indicate the occurrence of fault.

In an embodiment of the present invention, the fault signals are stored in an electronic memory storage location for future retrieval.

In another embodiment of the present invention, a counter receives the fault signals and upon receipt of a predetermined number of consecutive fault signals, generates a fault output signal. The fault output signal may result in a temporary shut down accompanied by a warning signal from a warning signal generator in order to apprize the operator of the possibility of a continuing error in the sealing operation.

According to one aspect of the present invention, the low threshold temperature value and the high threshold temperature value are obtained experimentally, and entered into respective electronic memory location by a user interface. The user interface may be a conventional keyboard.

According to another aspect of the present invention, an induction foil cap sealer can retain a plurality low threshold temperature and high threshold temperature values for future retrieval.

Other features and advantages of the present invention will become apparent from the following description of the invention which refers to the accompanying drawings.

BRIEF DESCRIPTION OF THE DRAWINGS

FIG. 1 schematically illustrates sealing by induction heating according to prior art.

FIGS. 2A-2C schematically show a number of sealing head configurations according to the prior art.

FIG. 3A shows a top plan view of an induction sealing system according to the present invention.

FIG. 3B shows a front plan view of an induction sealing system along line 3B-3B in FIG. 3A viewed in the direction of the arrows.

FIG. 3C shows a side plan view of an induction sealing system along line 3C-3C in FIG. 3B viewed in the direction of the arrows.

DETAILED DESCRIPTION OF THE INVENTION

Figure 4A:
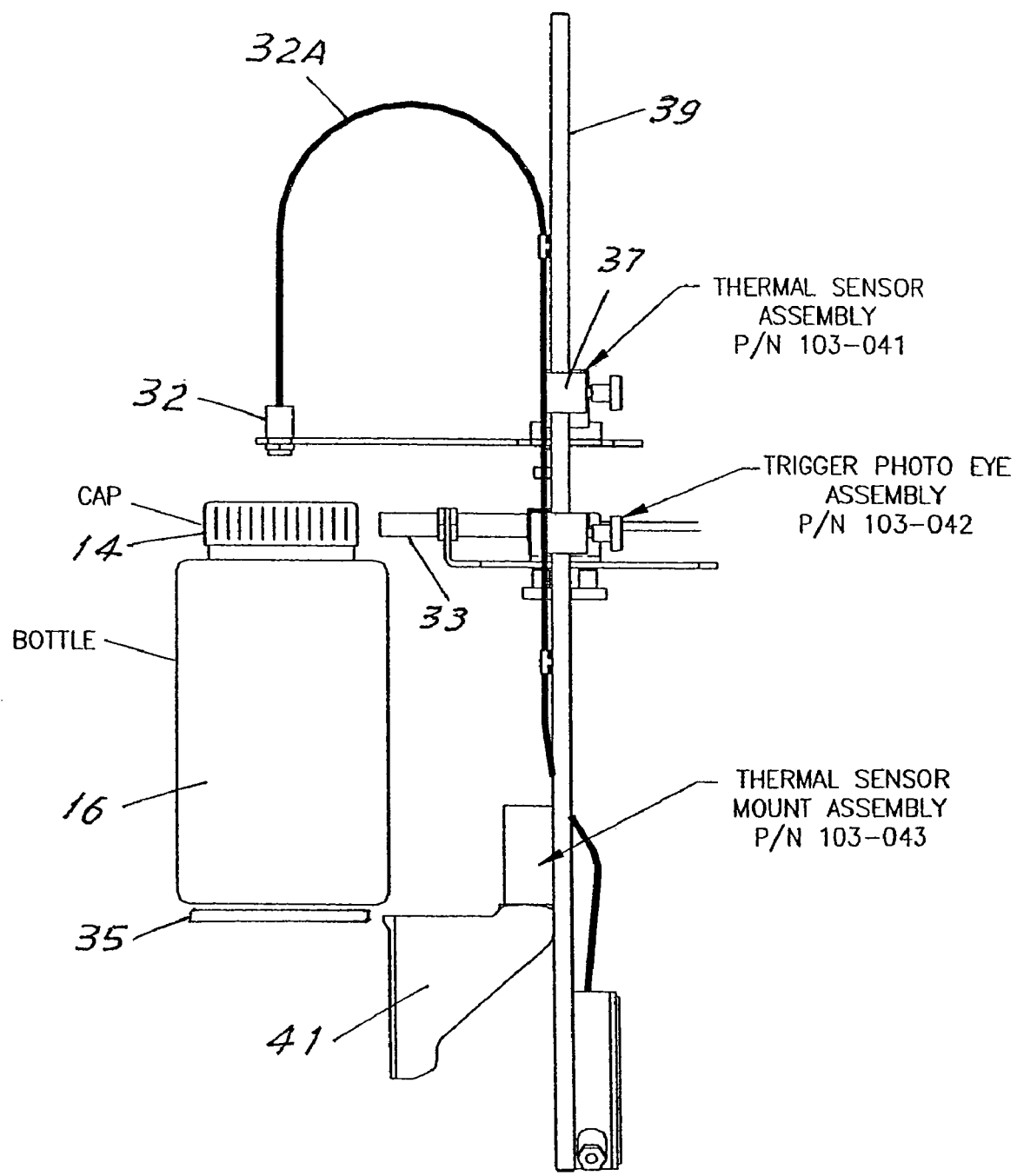
FIG. 4A schematically illustrates the positioning of a photo eye and a temperature sensor in an induction sealing system according to the present invention.

Referring to FIGS. 3A-3C, an induction foil cap sealer system according to an embodiment of the present invention includes induction cap sealer unit 30, which includes an induction head 10, which is not shown in FIGS. 3A-3C, but may be seen in FIGS. 1, and 2A-2C, and temperature sensor 32. A workpiece (e.g. a container such as bottle 16) is transported on conveyor belt 35 under induction head 10 to be subjected to induction heating in a conventional manner. Temperature sensor 32 is installed downstream near conveyor belt 35 to sense the temperature of a workpiece that has been heated under induction head 10.

In the preferred embodiment of the present invention, temperature sensor 32 may be an infrared sensor so that the temperature of the workpiece can be determined remotely; i.e., without making contact with the workpiece. A suitable infrared sensor can report the temperature in milliamps, or volts (DC).

Further, in the preferred embodiment of the present invention photo eye 33 may be installed downstream from temperature sensor 32 to detect the presence of a workpiece on conveyor belt 35 below temperature sensor 32.

Figure 4B:
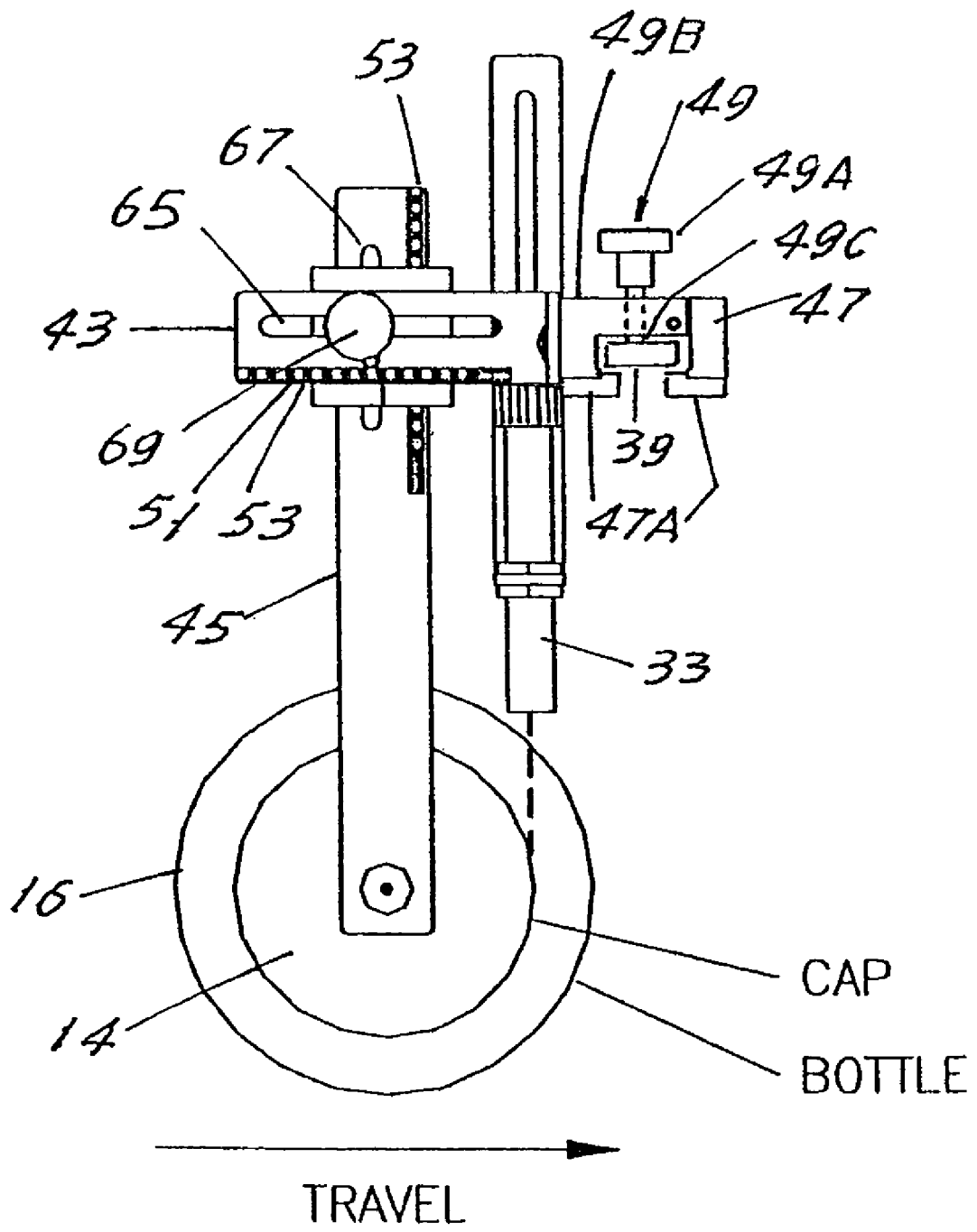
FIG. 4B schematically illustrates a top plan view of FIG. 4A.
Figure 4C:
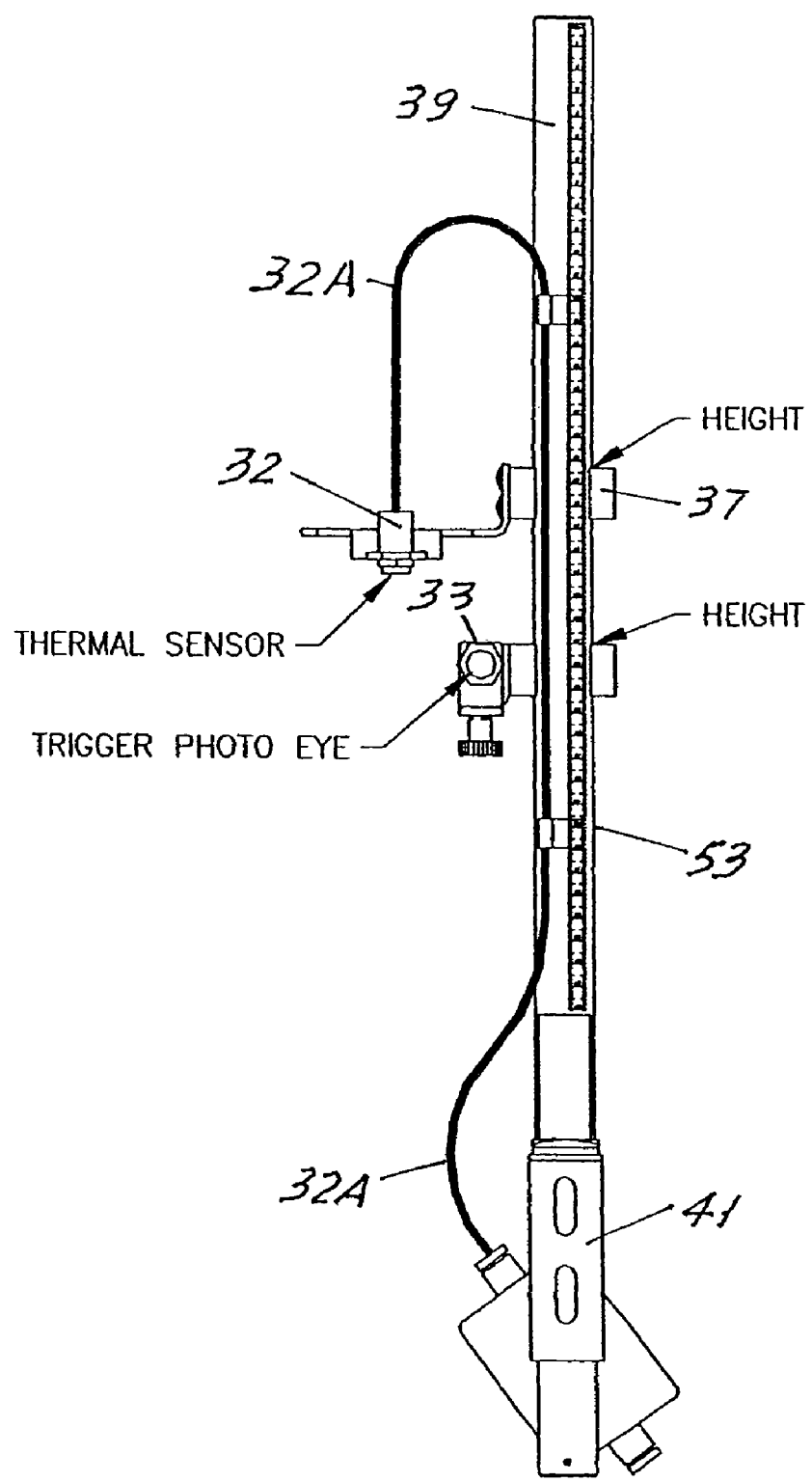
FIG. 4C schematically illustrates a front plan view of the arrangement illustrated by FIG. 4A (excluding the bottle).

Referring now to FIGS. 4A-4C, temperature sensor 32 is preferably mounted to collect thermal data from above a workpiece. Specifically, as shown in FIG. 4A, temperature sensor 32 may be mounted so that it may collect thermal data from cap 14 of bottle 16. Specifically, temperature sensor 32 is preferably mounted near conveyor belt 35 with a mount assembly which includes movable support 37, rod 39, and base 41. Base 41 is preferably adapted to be connected to a frame portion that supports conveyor belt 35. Temperature sensor 32 may be secured to rod 39 by movable support 37. Movable support 37 can be moved up or down along rod 39 in order to adjust the height of temperature sensor 32.

In the preferred embodiment of the present invention, movable support 37 includes offset bracket 43, and temperature sensor mounting bracket 45. Offset bracket 43 includes clamp 47. Clamp 47 includes mounting screw 49 and grip portion 49B. Mounting screw 49 includes knob 49A and a free end 49C which is intended to abut against rod 39. Grip portion 49B includes lips 47A which are disposed opposite to mounting screw 49. The tightening of mounting screw 49 results in the pressing of the free end of screw 49 against rod 39 which in turn causes lips 47A to press against rod 39, thereby securing clamp 47 to rod 39. Loosening of mounting screw 49 will allow offset bracket 43 to be moved up and down rod 39 so that the height of temperature sensor 32 above conveyor belt 35 can be adjusted.

Temperature sensor mounting bracket 45 is movably mounted on offset bracket 43. Specifically, temperature sensor mounting bracket 45 is mounted on offset bracket such that it may be moved in the direction transverse to conveyor belt 35 and rod 39, and transverse to rod 39 and parallel to conveyor belt 35 so that temperature sensor 32 may be properly positioned.

Figure 4D:
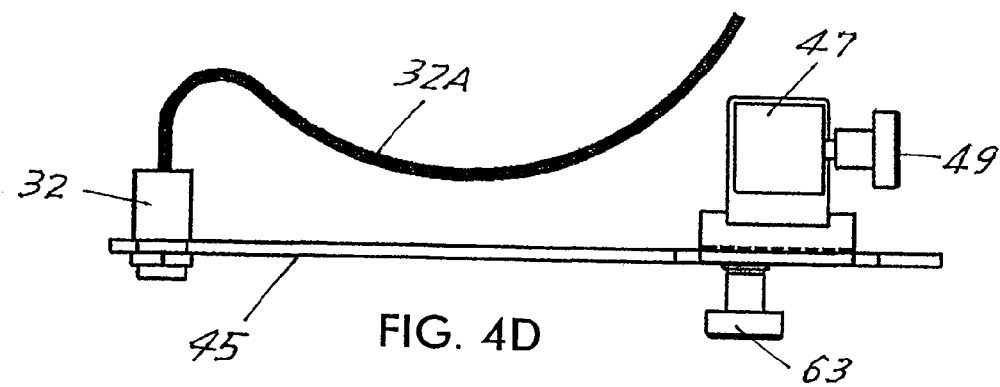
FIG. 4D schematically shows a side plan view of a mounting assembly for mounting a temperature sensor in an induction sealing system according to the present invention.

Specifically, referring to FIG. 4D, loosening of mounting screw 63 will allow temperature sensor bracket 45 to slide along slot 65 in offset bracket 43, and allow temperature sensor bracket 45 to be moved transverse to conveyor belt 35 because of slot 67 in temperature sensor bracket 45. It should be noted that in the preferred embodiment, mounting screw 63 extends through slot 65 and slot 67 and receives a locking nut 69 at the end thereof. The cooperation of mounting screw 63 and locking nut 69 secures temperature sensor bracket 45 in place.

In the preferred embodiment each of rod 39, offset bracket 43, and temperature sensor bracket 45 includes a scale 53 in order to allow for the proper positioning of temperature sensor 32.

Figure 4E:
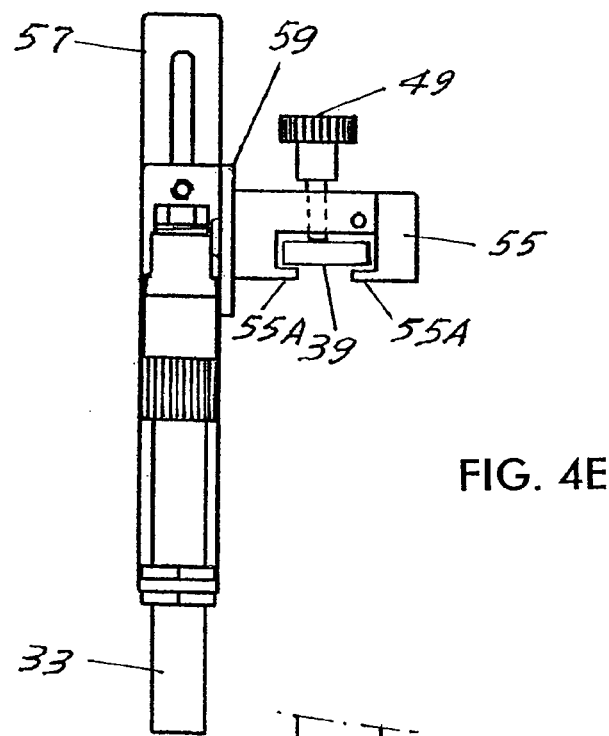
FIG. 4E schematically shows a top plan view of a mounting assembly for mounting a photo eye in an induction sealing system according to the present invention.

Referring to FIG. 4E, preferably, photo eye 33 is also movably mounted on rod 39 by a mounting assembly. The mounting assembly for mounting photo eye 33 includes clamping bracket 55 which can be mounted on rod 39 in the same manner as mounting bracket 47. That is, when mounting screw 49 is tightened lips 55A are pressed against rod 39 thereby securing clamping bracket 55 to rod 39. Photo eye 33 is supported on photo eye bracket 57 which is movably mounted on horizontal bracket 59. Horizontal bracket 59 is connected to mounting bracket 55.

Figure 4F:
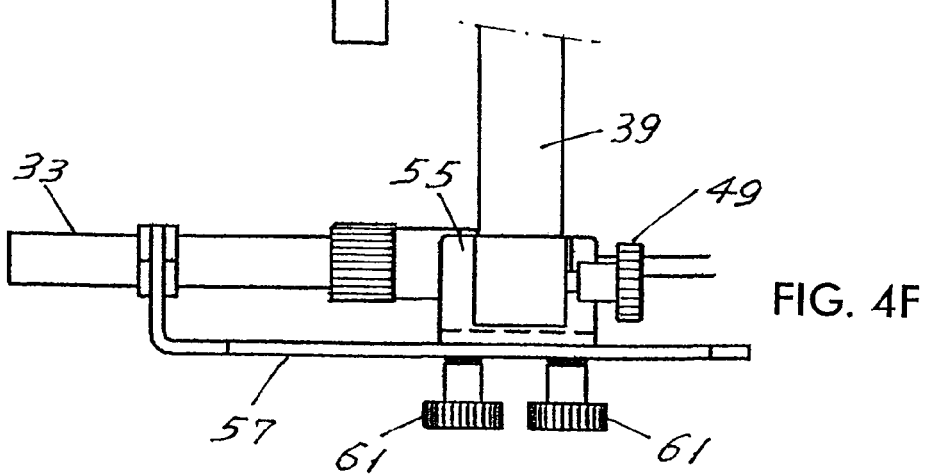
FIG. 4F schematically shows a side plan view of the mounting assembly shown in FIG. 4E.

Referring to FIG. 4F, by loosening mounting screws 61, photo eye bracket 57 can be moved, and by tightening mounting screws 61 photo eye bracket 57 can be secured. Thus, the position of photo eye 33 can be adjusted.

Figure 4G:
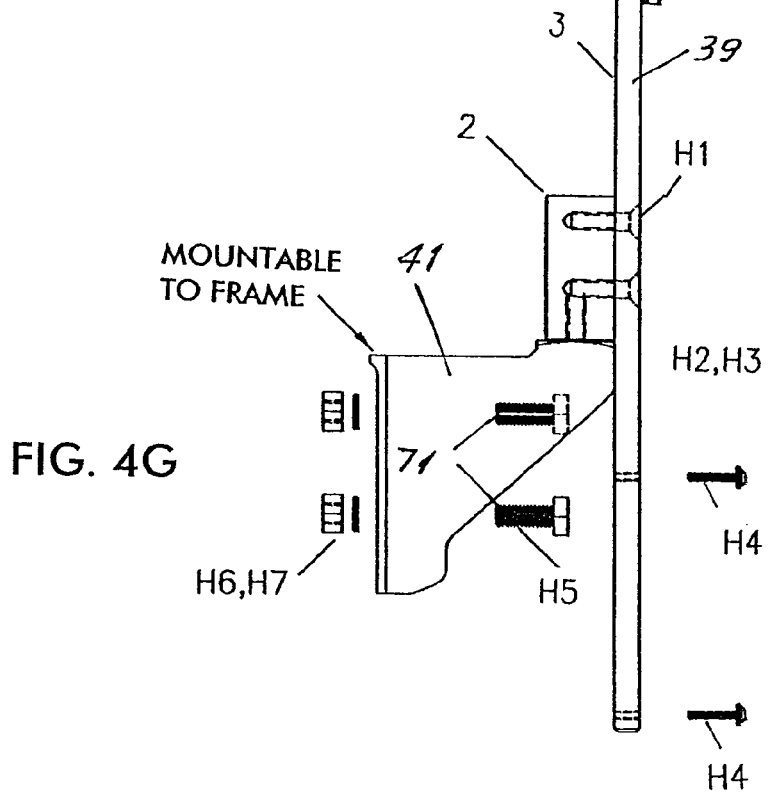
FIG. 4G schematically shows a side plan view of a mounting stand for receiving the mounting assembly for the temperature sensor and the mounting assembly for the photo eye.

To install temperature sensor 32 and photo eye 33, a suitable location is selected downstream from induction sealer unit 30 and the mounting assembly is mounted using, for example, screws 71 as shown in FIG. 4G. In the preferred embodiment, temperature sensor 32 is mounted 10 to 15 feet from induction sealer unit 30 to allow adequate time for the heat to reach the top of cap 14 of bottle 16. Next the height of temperature sensor 32 and the height of photo eye 33 are set along rod 39. The height of temperature sensor 32 is preferably set to be about 1" above cap 14 of a bottle 16, and the height of photo eye 33 is set so that it sees cap 14. Preferably, photo eye 33 is positioned ½" from the side of cap 14 of a bottle 16. It is preferred that temperature sensor 32 and photo eye 33 be positioned such that when photo eye 33 sees cap 14 of a bottle 16, temperature sensor 32 is over the center of cap 14 in that the temperature at the center of cap 14 is considered to provide the most reliable reading.

It should be noted that the position of photo eye 33 and temperature sensor 32 may depend on production requirements and preferences. In some cases, for example, it may be convenient to have photo eye 33 positioned to see bottle 16 (i.e. the container) rather than its cap 14.

The detection of a workpiece by photo eye 33 serves as an electronic trigger for the reading of the temperature from a workpiece. Specifically, in the preferred embodiment, temperature sensor 32 is always on and feeds its temperature readings to cap foil sealer 30 via a communication wire 32A. When photo eye 33 detects a workpiece, cap foil sealer 30 receives a signal from photo eye 33 via communication wire 33A and determines whether a good seal has been obtained based on the temperature reading of temperature sensor 32.

To assess whether a proper seal has been obtained, cap foil sealer 30 determines whether the temperature of a workpiece is within an acceptable range. If so, the workpiece is accepted. If not, a fault signal is generated. The generation of a fault signal can activate rejecter 42, which may be a pneumatic arm, so that a workpiece, which has been determined to have an improper seal, can be pushed off conveyor belt 35 onto rejecter table 42A. Alternatively, or in addition to rejecter 42, generation of a fault signal can activate warning signal generator 44, which may be an audio signal generator (e.g. alarm) for an optical signal generator (e.g. strobe light), or a combination of the two.

According to an aspect of the present invention, the temperature obtained from a workpiece by temperature sensor 32 is compared to a predetermined threshold temperature value in order to determine whether the workpiece has been properly sealed. Thus, for example, the temperature obtained by temperature sensor 32 is compared to a predetermined low temperature limit and/or high temperature limit in order to assess whether a proper seal has been obtained.

Figure 5:
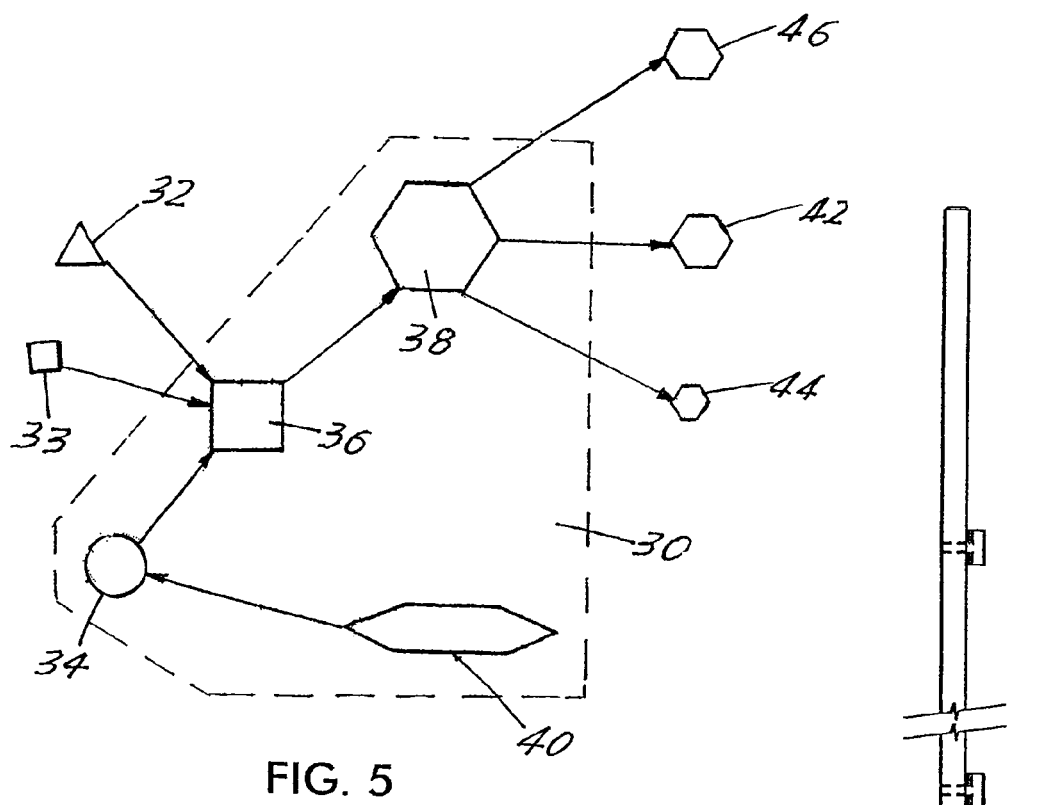
FIG. 5 illustrates aspects of a system according to the present invention.
Figure 6:
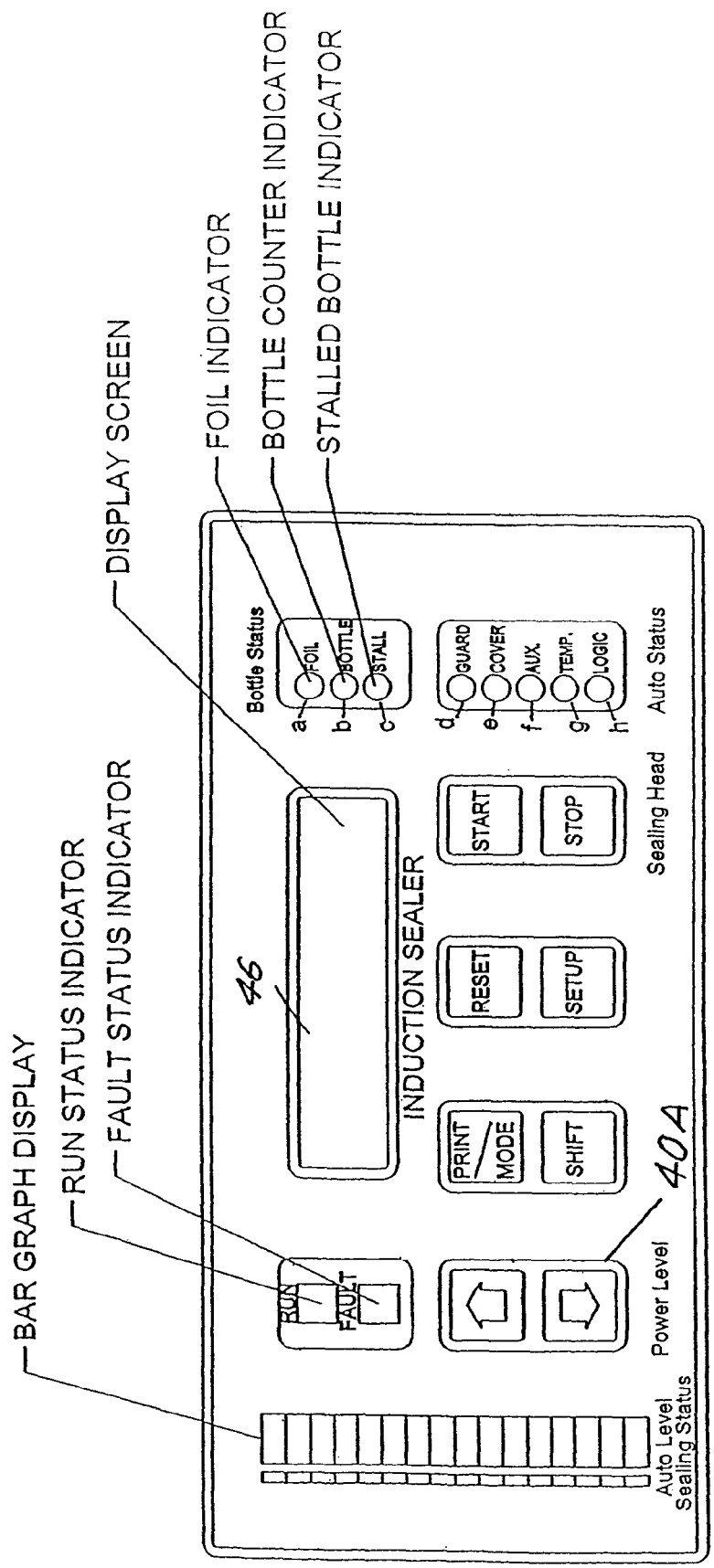
FIG. 6 shows an example of a user interface as used in an embodiment of the present invention.

Referring now to FIG. 5, cap foil sealer 30 according to the present invention includes electronic memory storage 34, comparator 36, controller 38, and user interface 40. Cap foil sealer 30 is in communication with temperature sensor 32. Optionally, cap foil sealer 30 may be in communication with peripheral devices such as mechanical rejecter 42, warning signal generator 44, or information display device 46 (FIG. 6).

According to the present invention, electronic memory storage 34 is capable of storing electronic data. According to an aspect of the present invention, the electronic data stored in electronic memory storage 34 may be electronic data corresponding to either one or both of a high threshold temperature value or a low threshold temperature value. A high threshold temperature value is indicative of overheating, while a low threshold temperature value is indicative of under heating. When the detected temperature is either below the low threshold temperature or above the high threshold temperature, there is improper sealing. For the purpose of entering electronic data into electronic memory storage 34, user interface 40 is in communication with electronic memory storage 34. A suitable user interface 40 may include a keyboard. An example of a keyboard suitable for a user interface is shown in FIG. 6. In the preferred embodiment of the present invention the up/down keys 40A can be used to set the values that are entered into electronic memory storage 34. User interface 40 may also include display device 46, which is capable of displaying the temperature of a workpiece as read by temperature sensor 32. Display device 46 may be an LCD.

Electronic data in electric memory storage 34 can be transferred to comparator 36. Furthermore, the information obtained by temperature sensor 32 is also transferable to comparator 36. Comparator 36 compares the information obtained by temperature sensor 32 to the electronic data retrieved from electronic memory storage 34 to determine whether a fault condition has occurred. If comparator 36 determines that a fault condition has occurred it sends a fault signal to controller 38. Controller 38 in turn sends a signal necessary to operate any one or all of peripheral devices. For example, controller 38 may generate signals for operating any one of or all of rejecter 42, warning signal generator 44, or information display device 46 by any of the known methods.

Figure 7:
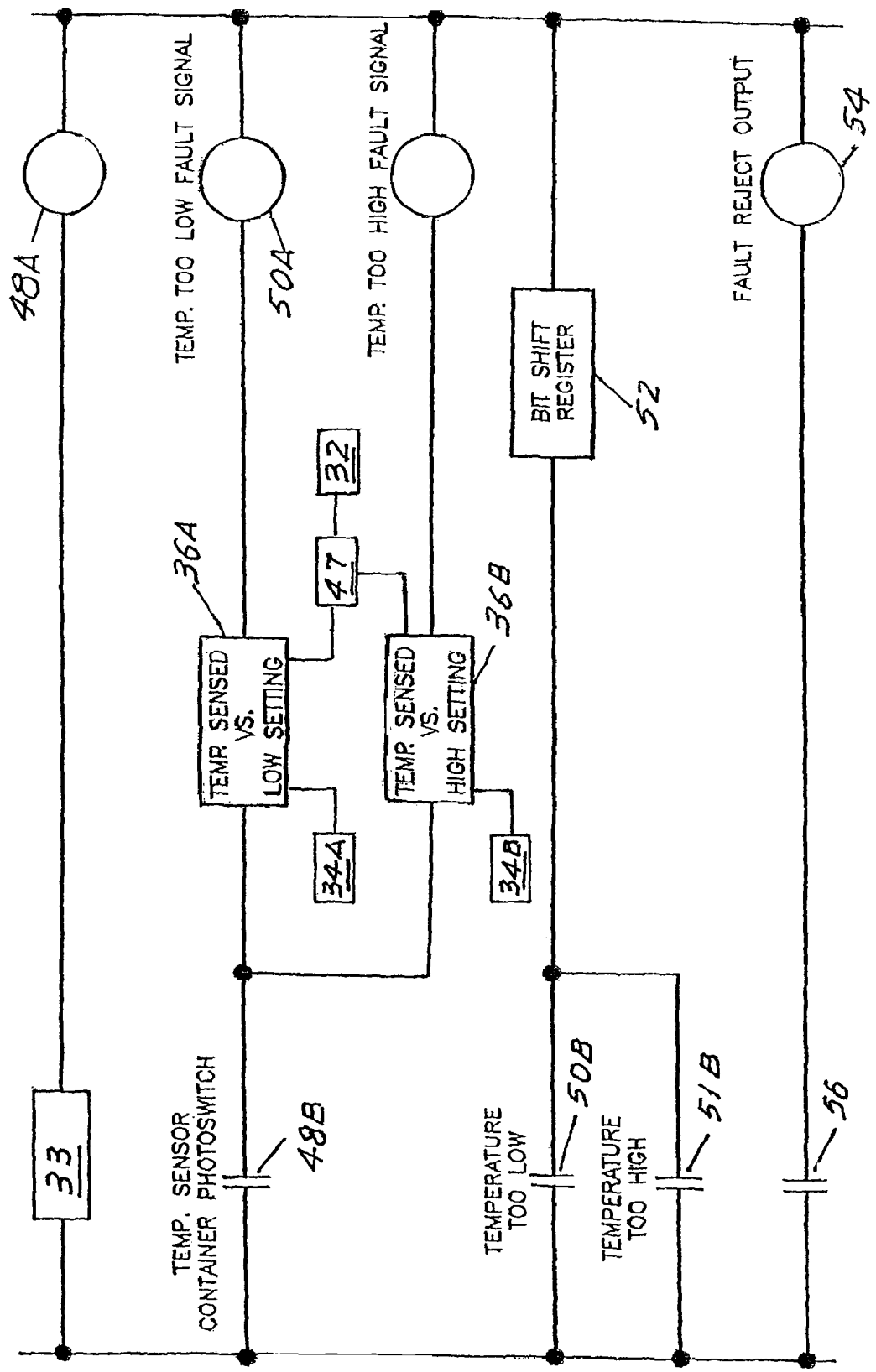
FIG. 7 illustrates a ladder logic illustrating a method and a system that includes a method according to an embodiment of the present invention.

Referring now to FIG. 7, once temperature sensor detects a temperature of a workpiece, the temperature information is transferred to a temporary electronic storage facility 47. Temporary electronic storage facility 47 may be any electronic memory device known to a person skilled in the art.

Once photo eye 33 sends an electronic signal indicating the presence of a workpiece (e.g. a bottle that has been subjected to induction heating), photo eye coil 48A receives a signal (e.g., a current) which activates relay 48B associated with photo eye 33. As a result, low threshold temperature comparator 36A obtains the last temperature information stored in temporary electronic storage facility 47 and the low threshold temperature value from low threshold temperature storage facility 34A. Low threshold temperature storage facility 34A may be stored in an electronic storage facility. The electronic storage facility may be any electronic memory storage device known in the art. If, upon comparison, the temperature sensed by temperature sensor 32 is less than the low threshold temperature value, a fault signal is generated. For example, a current is supplied to activate low temperature fault coil 50A which closes low temperature relay 50B. Upon closing of low temperature fault relay 50B, a signal is sent to bit shift register 52. Bit shift register 52 receives signals every time a fault signal is generated.

Similarly, after photo eye 33 sends an electronic signal indicating the passing of a workpiece, and relay 48 is closed, high threshold temperature comparator 36B obtains the high threshold temperature value stored in electronic storage facility 34B (which may be any electronic storage facility known by a skilled person in the art), and compares the same to the sensed temperature. If, upon comparison, it is determined that the sensed temperature is higher than the high threshold temperature, a fault signal is generated. For example, a current is supplied to high temperature fault coil 51A which results in the closing of high temperature fault relay 51B. Upon closing of high temperature fault relay 51B, a signal is sent to bit shift register 52.

According to one aspect of the present invention when a predetermined number of consecutive faults have been registered with bit shift register 52, a fault reject signal is generated. Thus, for example, a current is sent to fault reject coil 54 which activates reject relay 56.

The activation of reject relay can result in the activation of one or more of peripheral devices by controller 38 to indicate to the operator that a fault has occurred. Optionally, activation of reject relay 56 can result in the shut down of the production line or conveyor.

The high threshold temperature value and the low threshold temperature value are preferably supplied to electronic memory storage 34 through manual entry if a keyboard is used as user interface 40. It should be noted that other methods for setting the low threshold temperature and the high threshold temperature can also be used without deviating from the present invention. For example, an analog device such as a mechanical dial may be used to set the high threshold temperature value and the low threshold temperature value.

Preferably, the total number of faults detected by the system is stored in electronic memory storage 36 or some other electronic memory storage location for further retrieval.

Due in part to the fact that different containers are made from different materials, the high threshold temperature value and the low threshold temperature value can vary from container to container. Therefore, the values for high threshold temperature and the low threshold temperature must be obtained experimentally. Thus, in a preferred embodiment, the following calibration procedure may be carried out to determine the range of temperatures outside of which a good seal is not obtained.

To determine the proper temperature range, for example, first a proper seal temperature is determined according to the following procedure:

1. Sealing head 10 is centered with conveyor belt 35 and bottles 16 are run under sealing head 10 such that caps 14 of bottles 16 are positioned near or at the center of sealing head 10.

2. Height of sealing head 10 is set.

3. Conveyor line speed is set. Initially, conveyor speed is set at the slowest possible speed to keep up with production (a slow speed maximizes sealing time).

4. It is ensured that caps 14 of bottles 16 (seal point on bottle) are free of burrs, product, seams, etc.

5. It is ensured that caps 14 of bottles 16 are properly tightened.

6. The power is set at an initial value (e.g. 35%) and a single bottle is subjected to induction heating, and is examined to determine whether it has been sealed. If partially sealed, a new bottle 16 is subjected to induction heating with increased power. If not, the test is conducted again with a 10% power increase. The test is repeated with increasing power until a proper seal is obtained. If after a test the inside of cap 14 of bottle 16 that is being tested is scorched or burned, power is reduced by 5-10% and the test is repeated.

7. A group of bottles is run under sealing head 10 to verify seal quality remains the same in each bottle. If not, step six (6) is repeated.

The steps in Table 1 can be carried out to determine the quality of a seal.

TABLE 1

| | DESCRIPTION | YES | NO |
|---|---|---|---|
| 1 | Was the seal completely cool before removing the cap? | Go to two (2) | Let the cap cool for two (2) minutes before removing the cap |
| 2 | Foil liner melts bottle top? | Reduce power level | Go to three (3) |
| 3 | Was there any burning or scorching of the cap? | Reduce power level | Go to four (4) |
| 4 | Did the wax release from the foil liner and pulp board? | Go to five (5) | Increase power level |
| 5 | Did the liner seal completely around the opening? | Go to six (6) | Increase power level |
| 6 | Does the seal leak? | Increase power level | Go to seven (7) |
| 7 | Drop the bottle or step on an empty bottle with the cap off (plastic bottles only). Does the seal come off the bottle? | Increase power level. | Go to eight (8) |
| 8 | Does the seal release easily (for peel off seals)? | Power level set correctly. | Reduce power slightly |
| 9 | For security liners, is a foil ring left on the bottle? | Power level set correctly | Increase power level |

The high threshold temperature value and the low threshold temperature value can be obtained, for example, as follows:

1. The settings for achieving a good seal is determined.

2. Several containers are run past temperature sensor 32 and the temperature is recorded.

3. The power level is lowered to obtain the minimum power for a good seal.

4. Several containers are run past temperature sensor 32 and the temperature is recorded.

5. The power level is raised to obtain the maximum power for a good seal without burning.

6. Several bottles 16 are run past temperature sensor 32 and the temperature is recorded.

7. Optionally, for a safety factor a few degrees are added to the lowest threshold temperature value.

8. Optionally, for a safety factor a few degrees are subtracted from the highest temperature.

In the preferred embodiment of the present invention factors such as the type of bottle used, the conveyor speed, the low and high threshold temperature values, and other relevant factors may be stored as a "recipe" in a memory location and retrieved when desired. Preferably, information such as the conveyor speed, the low and high threshold temperatures and other information relevant to obtaining a proper seal as obtained experimentally can be stored as a "recipe" in an electronic location for more than one bottle type so that a cap sealer according to the present invention can be ready to seal a number of bottle types without the necessity of the re-entry of the required information. Thus, for example, when the bottle type is changed, the information relating to that bottle type is retrieved from the memory location and used for sealing.

In the present application a number of references have been made to electronic storage facilities for the storage of data, such as, for example, the low and the high threshold temperatures. One skilled in the art would recognize that any known electronic storage devices can be used to in an apparatus according to the present invention. Thus, for example, information storage can occur in a flash memory (erasable memory) which can be part of a microprocessor, or it can be stored in the non-volatile (battery-backed) RAM of, for example, a time keeping chip. Flash allows storage for forty years without having to worry about batteries, and thus is suitable for information that should not be lost (e.g. total hours of machine use, not desirable to lose this time if battery is changed; or recipes settings (e.g. temperature settings) which are not desired to be redone). Other less important information may be kept in, for example, the time keeping chip. To ensure that such information is not lost, a capacitor may be used with stored power to quickly transfer information to the flash memory when the apparatus is powered down in order to avoid losing the data.

It should be noted that the present invention is not limited to induction foil cap sealing, but may be applicable to any manufacturing application in which temperature sensing may be considered an important quality assurance factor. For example, the concepts disclosed herein may be applicable to bottle molding, or candy making.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A process for sealing a container comprising:
providing a container;
providing a foil at a region on said container to be sealed;
heating said foil;
acquiring temperature of said region on said container after heating; and
comparing said temperature to a threshold temperature value to determine whether said container has been sealed.

2. A process according to claim 1, wherein said temperature is acquired by an infrared detector.

3. A process according to claim 1, wherein said foil is metallic and said container is comprised of a plastic.

4. A process according to claim 1, wherein said threshold temperature is a minimum temperature indicative of improper sealing.

5. A process according to claim 1, wherein said threshold temperature is a maximum temperature indicative of improper sealing.

6. A process according to claim 1, further comprising electronically storing a threshold temperature value in an electronic storage facility, and obtaining said threshold temperature value before said comparing.

7. A process according to claim 6, further comprising experimentally determining said threshold temperature value before said storing.

8. A process according to claim 1, further comprising electronically storing a threshold temperature value in an electronic storage facility for a number of different containers.

* * * * *